Patented Aug. 4, 1936

2,050,043

UNITED STATES PATENT OFFICE 2,050,043

WELD ROD

Anthony G. de Golyer, New York, N. Y., assignor to Vulcan Alloy Corporation, a corporation of Delaware No Drawing. Application April 7, 1936, Serial No. 73,096

2 Claims. (Cl. 219—8)

This invention relates to a new alloy steel and relates particularly to an alloy steel containing chromium, manganese, molybdenum and boron, as well as certain other essential elements, in the form of weld rod for the production of welded surfaces or sections characterized by relatively high degree of hardness, resistance to abrasion and resistance to deformation under impact.

In many industrial operations it is desirable to apply a facing or inlay of hard wear resistant metal to parts of machinery or other equipment exposed to excessive abrasion or impact. Various alloys and materials have been proposed for this purpose. All of such heretofore suggested compositions contain high percentages of alloy elements, together with at least 1% or more carbon. In general, weld metal deposited with such compositions may have high hardness, i. e. approximately 500 Brinell hardness numbers, but all of such deposits are relatively brittle and consequently are not suitable for use on surfaces exposed to impact or shock.

Cast manganese steel containing 12% to 14% manganese has been extensively used for such purposes. However, such steel must be heat treated in order to develop the desired physical properties. It is a well known metallurgical fact that none of the manganese steel compositions are entirely suitable for the production of welded deposits having high hardness and high resistance to deformation under impact.

The object of this invention is to provide an alloy which possesses, in combination, better physical properties and characteristics than manganese steel, or other heretofore known alloys intended more or less as substitutes therefor; and which may be readily applied by welding to either material of the same composition, manganese steel, or to a large number of other alloy and carbon steels.

I have found that an alloy composed of chromium 9% to 15%, manganese 1% to 4%, metal from the group molybdenum and tungsten 1% to 4%, boron 0.50% to 2.25%, carbon 0.20% to 0.90%, silicon 0.15% to 1.50% and the remainder principally iron, possesses high hardness, high strength and is extremely resistant to deformation under impact when deposited by any suitable means of welding, such as by the oxyacetylene or electric arc methods. Metal so deposited has a hardness of from 450 to 650 Brinell. The deposits may be ground by means of a suitable medium but cannot be machined or cut by high speed steel. The alloy of the present invention is of the air hardening type and is well adapted to the formation of overlays or inlays by fusion welding. However, when desired, the alloy may be cast to shape, such as in a bar or strip and such preformed shape may be welded by any suitable means to a steel of different composition, for the purpose of giving thereto a surface or facing which is particularly resistant to wear. In general, the alloy cannot be forged or otherwise mechanically worked. So far as I have been able to determine, neither the hardness nor other physical properties of the alloy can be materially altered by heat treatment.

The alloy of the present invention is equally adaptable to fusion and deposition by either the oxyacetylene or electric arc process. When the alloy, in the form of a weld rod, is deposited by oxyacetylene welding, it is not necessary to employ a flux. When the alloy is used as an electrode in arc welding, I usually prefer to employ a flux. The composition has a high degree of weldability and the deposits are exceptionally sound and uniform. One outstanding advantage of the present alloy is that welds made by the electric arc method have substantially the same degree of high hardness as welds made with the oxyacetylene method. Welded deposits of the alloy, which have been subjected to extensive cold working or impact usually show an increase in hardness of from 50 to 150 Brinell numbers compared to the hardness of the alloy in the welded condition. It is a further important advantage that the composition, when in the condition of maximum hardness, retains substantially all of the original high resistance to deformation under impact. Extensive use of the alloy of the present invention in numerous industrial applications has demonstrated that it has a service life several times longer than that of heat treated manganese steel castings.

The essential components of my alloy are chromium, manganese, metal from the group molybdenum and tungsten, boron, carbon, silicon and iron. The principal constituent of the alloy is iron. The chromium content should be between 9% and 15%, the manganese between 1% and 4%, the content of metal from the group molybdenum and tungsten between 1% and 4%, the boron content 0.50% and 2.25%, the carbon content between 0.20% and 0.90%, the silicon content between 0.15% and 1.50% and the balance principally iron. It will be understood that the alloy will usually contain minor amounts of phosphorus, sulphur and other impurities incidental to manufacture. The amounts of such incidental impurities should be within the maximum limits usually prescribed for alloy steeys. I also wish to explain that vanadium may be present in amounts from approximately 0.15% to 0.75%, but the inclusion of this element is in no way essential.

As specific examples, alloys within the scope of the present invention which I have found to be particularly suitable for the facing by welding of new or worn equipment are the following: chromium 12.79%, manganese 2.31%, molybdenum 2.05%, boron 0.66%, carbon 0.60%, silicon 1.15% and the balance principally iron; chromium 11.95%, manganese 2.15%, molybdenum 1.90%, boron 1.15%, carbon 0.35%, silicon 0.35% and the balance principally iron; chromium 13.40%, manganese 2.85%, molybdenum 2.55%, boron 1%, carbon 0.50%, silicon 0.60% and the remainder principally iron.

I claim:

1. A weld rod comprising a metallic composition containing chromium 9% to 15%, manganese 1% to 4%, metal from the group molybednum and tungsten 1% to 4%, boron 0.50% to 2.25%, carbon 0.25% to 0.90, silicon 0.15% to 1.50% and the balance iron.

2. A weld rod comprising a metallic composition containing chromium 9% to 15%, manganese 1% to 4%, molybdenum 1% to 4%, boron, 0.50% to 2.25%, carbon 0.20% to 0.90%, silicon 0.15% to 1.50% and the balance iron.

ANTHONY G. DE GOLYER.